US012440909B2

(12) United States Patent
Kumamoto et al.

(10) Patent No.: US 12,440,909 B2
(45) Date of Patent: Oct. 14, 2025

(54) CONTROL DEVICE FOR MACHINE TOOL

(71) Applicant: FANUC CORPORATION, Yamanashi (JP)

(72) Inventors: Yuuki Kumamoto, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 516 days.

(21) Appl. No.: 17/906,696

(22) PCT Filed: Mar. 24, 2021

(86) PCT No.: PCT/JP2021/012230
§ 371 (c)(1),
(2) Date: Sep. 19, 2022

(87) PCT Pub. No.: WO2021/193712
PCT Pub. Date: Sep. 30, 2021

(65) Prior Publication Data
US 2023/0133532 A1    May 4, 2023

(30) Foreign Application Priority Data
Mar. 26, 2020    (JP) .................................. 2020-056080

(51) Int. Cl.
*B23F 23/12*    (2006.01)
*B23Q 15/013*    (2006.01)
*G05B 19/401*    (2006.01)

(52) U.S. Cl.
CPC ............ *B23F 23/12* (2013.01); *B23Q 15/013* (2013.01); *G05B 19/401* (2013.01); *G05B 2219/35519* (2013.01)

(58) Field of Classification Search
CPC ... G05B 19/4163; G05B 19/401; B23F 17/00; B23F 19/00; B23F 9/10; B23F 23/006; B23Q 15/013
(Continued)

(56) References Cited

U.S. PATENT DOCUMENTS 8,790,159 B2 *  7/2014  Baldeck ................. B23F 17/00
                                              451/147
9,841,746 B2 * 12/2017  Irie ......................... G05B 19/19
(Continued)

FOREIGN PATENT DOCUMENTS

CN      1701884 A  * 11/2005  ............. B23F 17/00
CN    104339038 A     2/2015
(Continued)

OTHER PUBLICATIONS

International Search Report issued in PCT/JP2021/012230; mailed May 11, 2021.

*Primary Examiner* — Ronald D Hartman, Jr.
(74) *Attorney, Agent, or Firm* — Studebaker Brackett PLLC

(57)    ABSTRACT

Provided is a control device for a machine tool, the control device being capable of reliably reducing noise when gears mesh with each other and providing intended machining quality. A control device 10 for a machine tool machines a workpiece W including at least one tooth surface and comprises: a machining condition input unit 15 which can input a machining condition including at least one of specifications of the workpiece W, specifications of a tool T, a feed speed, the rotational speed of a spindle, and the number of teeth; a surface pattern calculation unit 16, which calculates, on the basis of the machining condition, a surface pattern defined on the basis of intervals of scratches occurring on a machined surface; a swing command generation unit 17, which generates, on the basis of the surface pattern,
(Continued)

a swing command for achieving a surface pattern including a portion in which the intervals of the scratches are unequal; and a position and speed control unit 14 which carries out the machining while swinging the workpiece W and the tool T relatively to each other on the basis of the swing command generated by the swing command generation unit 17.

7 Claims, 5 Drawing Sheets

(58) Field of Classification Search
USPC .......................................................... 700/159
See application file for complete search history.

(56) References Cited

U.S. PATENT DOCUMENTS

| | | | | |
|---|---|---|---|---|
| 2012/0209418 A1* | 8/2012 | Winkel | .................. | G05B 19/19 |
| | | | | 700/159 |
| 2019/0310600 A1* | 10/2019 | Yamamoto | ........... | G05B 19/182 |

FOREIGN PATENT DOCUMENTS

| CN | 105373098 A | 3/2016 |
|---|---|---|
| CN | 107234255 A | 10/2017 |
| CN | 107885159 A | 4/2018 |
| CN | 110695762 A | 1/2020 |
| JP | 2002-082063 A | 3/2002 |
| JP | 4824947 B2 | 11/2011 |
| JP | 2019-185780 A | 10/2019 |
| WO | 2016/067372 A1 | 5/2016 |

* cited by examiner

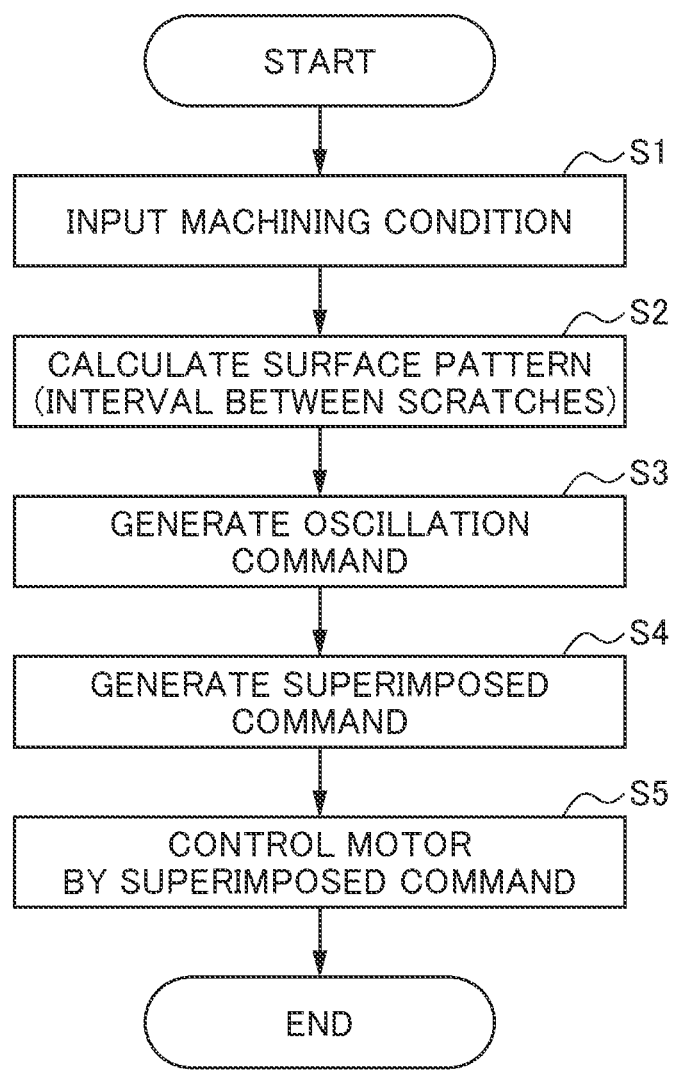

CONTROL DEVICE FOR MACHINE TOOL

TECHNICAL FIELD

The present invention relates to a control device for a machine tool.

BACKGROUND ART

In a machining process, an aggregate of minute scratches generated by machining forms a machined surface as a result.

For example, in a gear machining process, such minute scratches are normally equally spaced. However, in the case where the gears having equally spaced scratches mesh with each other, a periodic noise is generated, which leads to generation of a driving noise.

To address the above-mentioned noise, a technique has been disclosed according to which a feedrate dynamically changes so that the intervals between the scratches will be irregular (for example, see Japanese Patent No. 4824947). This technique is said to make it possible to reduce the noise when the gears mesh with each other.
Patent Document 1: Japanese Patent No. 4824947

DISCLOSURE OF THE INVENTION

Problems to be Solved by the Invention

However, Japanese Patent No. 4824947 does not disclose a specific method for making the intervals between the scratches irregular. Therefore, the effect of reducing the noise cannot be obtained in some cases due to poor reproducibility, and furthermore the variation in the machining quality may be caused.

Accordingly, there is a demand for a control device for a machine tool, the control device being capable of reliably reducing noise when gears mesh with each other and providing desired machining quality.

Means for Solving the Problems

An aspect of the present disclosure provides a control device for a machine tool that machines a workpiece including at least one tooth surface. The control device for a machine tool includes: a machining condition input unit that can input a machining condition including at least one selected from specifications of the workpiece, specifications of a tool, a feedrate, a spindle speed, and the number of teeth; a surface pattern calculation unit that calculates, based on the machining condition input by the machining condition input unit, a surface pattern defined depending on intervals between scratches generated on a machined surface; an oscillation command generation unit that generates, based on the surface pattern calculated by the surface pattern calculation unit, an oscillation command for achieving a surface pattern including a portion in which the intervals between the scratches are unequal; and a control unit that carries out machining while oscillating the workpiece and the tool relative to each other on the basis of the oscillation command generated by the oscillation command generation unit.

Effects of the Invention

The present disclosure provides a control device for a machine tool, the control device being capable of reliably reducing noise when gears mesh with each other and providing desired machining quality.

BRIEF DESCRIPTION OF THE DRAWINGS

FIG. 6 is a flowchart showing procedural steps by a control device 10 for a machine tool according to an embodiment of the present disclosure.

PREFERRED MODE FOR CARRYING OUT THE INVENTION

Hereinafter, an embodiment of the present invention will be described in detail with reference to the drawings.

Figure 1:
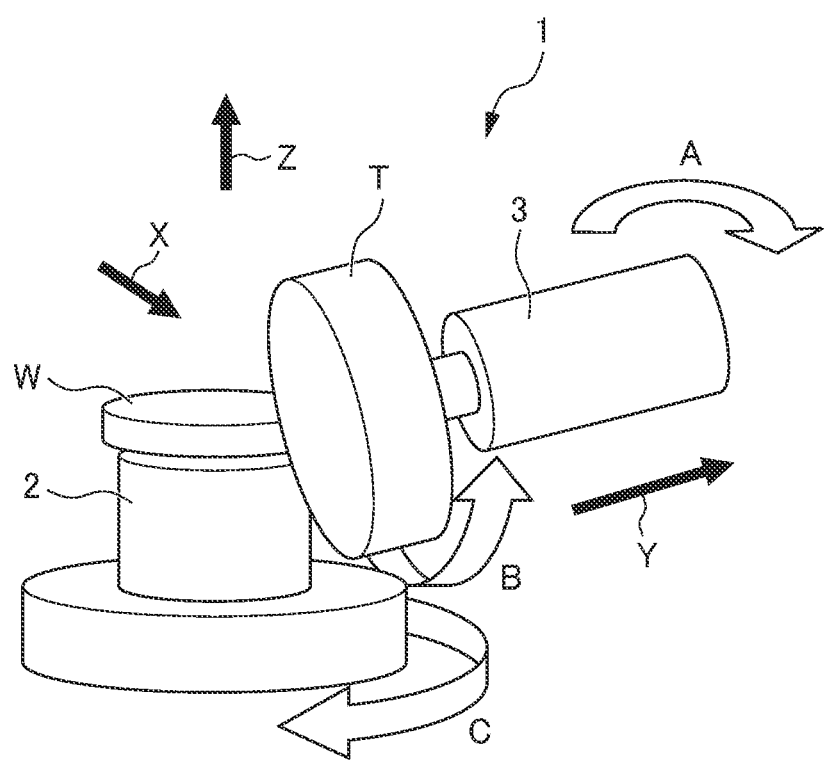
FIG. 1 is a diagram showing an axis configuration of a machine tool according to an embodiment of the present disclosure.

FIG. 1 is a diagram showing an axis configuration of a machine tool according to an embodiment of the present disclosure. The machine tool according to the present embodiment is a tool for machining a workpiece including at least one tooth surface, and is, for example, a gear machine tool 1 as shown in FIG. 1. Examples of the gear machine tool 1 include a gear grinding machine capable of grinding a gear or a hobbing machine capable of cutting a gear.

As shown in FIG. 1, an axis configuration of the machine tool according to the present embodiment includes, with respect to a workpiece W having a circular columnar shape, an X axis which is a feed axis in a radial direction (workpiece radial direction), a Y axis which is a feed axis in a tangential direction (workpiece tangential direction), a Z axis which is a feed axis in an axial direction (workpiece axial direction), an A axis (tool inclination axis) which is a rotation axis allowing rotation as rotation about the X axis, a B axis (tool rotation axis) which is a rotation axis allowing rotation as rotation about the Y axis, and a C axis (workpiece rotation axis) which is a rotation axis allowing rotation as rotation about the Z axis. A moving or rotating mechanism (not shown) including a motor is provided in each axis to allow movement in each axial direction or rotation about each axis. In the gear machine tool 1, the workpiece W is rotated about the C axis by a workpiece shaft 2 and a tool T is rotated about the B axis by a tool shaft 3, whereby the workpiece W and the tool T are relatively moved in each axial direction so that grinding or cutting is performed on the workpiece W.

Figure 2:
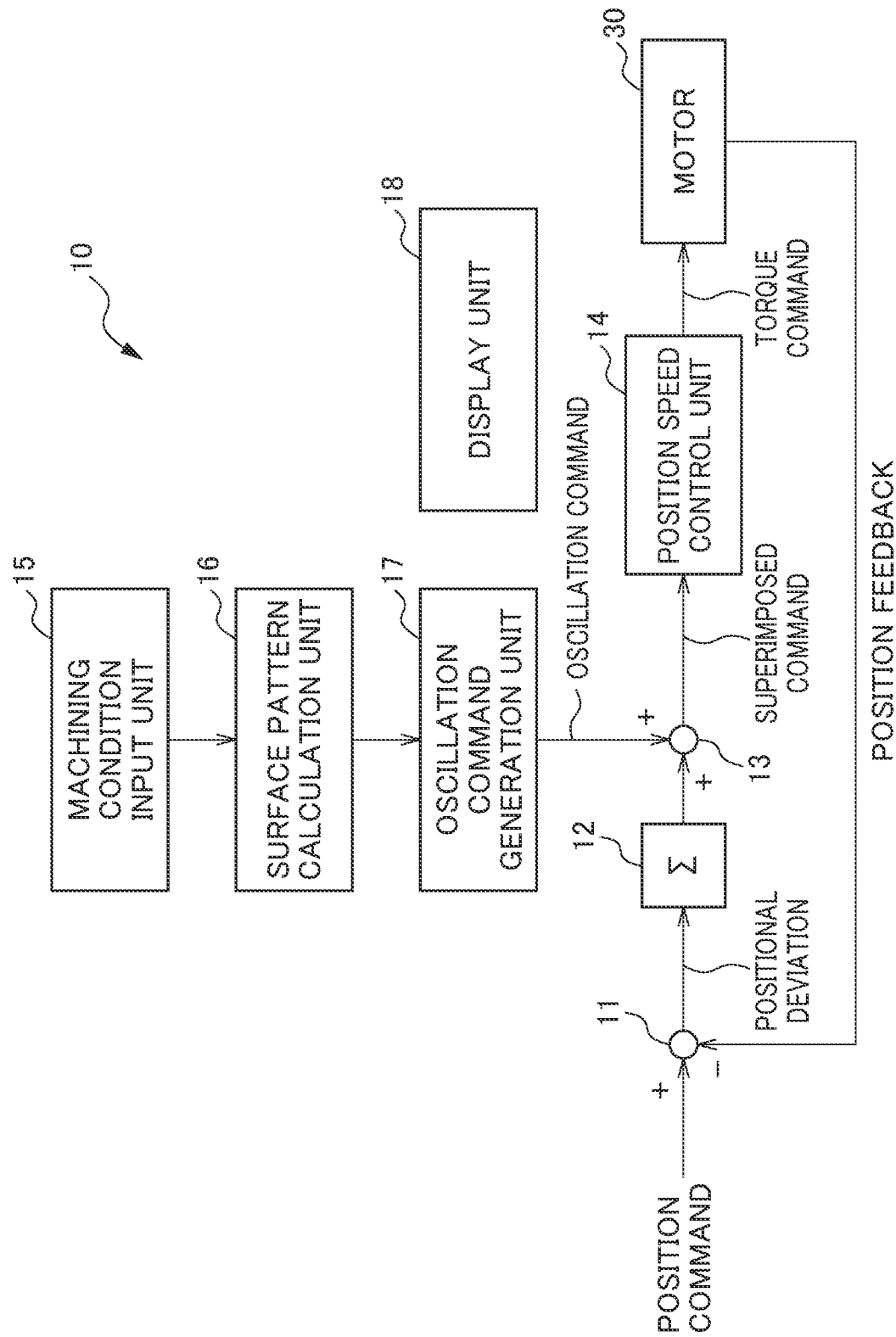
FIG. 2 is a functional block diagram showing a control device for a machine tool according to an embodiment of the present disclosure.

FIG. 2 is a functional block diagram of a control device 10 for a machine tool according to an embodiment of the present disclosure. The control device 10 for a machine tool according to the present embodiment performs grinding or cutting by controlling a motor of a spindle for relatively rotating the tool T and the workpiece W and controlling a motor 30 of a feed axis for moving while oscillating the tool T and the workpiece W relative to each other. The control device 10 for a machine tool according to the present embodiment is constituted by a computer including a CPU, a memory, and the like, for example.

As shown in FIG. 2, the control device 10 for a machine tool according to the present embodiment includes an adder 11, an integrator 12, an adder 13, a position speed control unit 14, a machining condition input unit 15, a surface pattern calculation unit 16, an oscillation command generation unit 17, and a display unit 18.

The adder 11 calculates positional deviation. Specifically, the adder 11 calculates positional deviation which is a difference between position feedback based on position detection by an encoder of the motor 30 of the feed axis and a position command of the feed axis from a numerical control device (not shown) or the like.

The integrator 12 calculates an integration value of the positional deviation. Specifically, the integrator 12 integrates the positional deviation calculated by the above-described adder 11, to thereby calculate an integration value of the positional deviation.

The adder 13 generates a superimposed command. Specifically, the adder 13 adds (superimposes) an oscillation command generated by the oscillation command generation unit 17, which will be described later, to (on) the integration value of the positional deviation calculated by the above-described integrator 12, to thereby generate a superimposed command. Alternatively, the adder 13 may add the oscillation command generated by the oscillation command generation unit 17 to a movement command (position command).

More specifically, the adder 13 superimposes the oscillation command generated by the oscillation command generation unit 17, which will be described later, on the position command or the positional deviation (integration value) of at least one axis. An axis on which the oscillation command is to be superimposed is at least one selected from axes of the machine tool related to machining, and specifically, is at least one selected from among five axes in total including three axes of the X axis, the Y axis, and the Z axis which are the feed axes, the B axis which is the tool rotation axis, and the C axis which is the workpiece rotation axis. When the oscillation command is superimposed on the A axis which is the tool inclination axis, engagement itself between grooves of the workpiece W and the tool T may change, and therefore it is preferable that the oscillation command is superimposed on the five axes other than the A axis.

Note that in the present embodiment, there may be provided a learning control unit (not shown) that calculates a compensation amount of the superimposed command on the basis of the above-described positional deviation and adds the calculated compensation amount to the superimposed command to thereby compensate the superimposed command. The learning control unit includes a memory that stores therein the deviation between an ideal position and an actual position of the motor 30 that can define a certain cycle, and calculates a compensation amount enabling the deviation to approach 0 by reading, for each cycle, the deviation stored in the memory, and superimposes the calculated compensation amount on the superimposed command to compensate the superimposed command. The superimposed command of the present embodiment includes the oscillation command, which easily causes the positional deviation, but the compensation by this learning control unit makes it possible to improve the follow-up performance to a periodic oscillation command.

The position speed control unit 14 generates, on the basis of the superimposed command generated by the above-described adder 13, a torque command for the motor 30 that drives the feed axis, and controls the motor 30 according to the generated torque command. Thus, the gear machining is carried out while relatively oscillating the workpiece W and the tool T.

The position speed control unit 14 may synchronously control a plurality of axes such that the workpiece W and the tool T are relatively oscillated in a direction along a tooth trace (tooth surface). This will be described in detail later.

The machining condition input unit 15 can input a machining condition including at least one selected from specifications of the workpiece W, specifications of the tool T, a feedrate, a spindle speed, and the number of teeth. Here, examples of the specifications of the workpiece W include a diameter of the workpiece W, and materials of the workpiece W, and examples of the specifications of the tool T include the number of threads in the case of a grindstone, and the number of teeth in the case of a cutting blade. The number of teeth refers to the number of teeth of the gear.

The surface pattern calculation unit 16 calculates, on the basis of the machining condition input by the machining condition input unit 15, a surface pattern defined on the basis of the intervals between scratches generated on a machined surface. The scratches generated on the machined surface are scratches formed when the tool T comes in contact with the workpiece W, and a surface pattern is defined depending on intervals between the scratches. The intervals between the scratches are determined by the machining condition input by the machining condition input unit 15, and the intervals are constant. That is, the scratches are formed at equal intervals on the machined surface of the workpiece W machined by the input machining condition. A method of calculating the surface pattern will be described in detail later.

The oscillation command generation unit 17 generates, on the basis of the surface pattern calculated by the surface pattern calculation unit, an oscillation command for achieving a surface pattern including a portion in which the intervals between the scratches are unequal. Specifically, the oscillation command generation unit 17 generates an oscillation command having an oscillation frequency or an oscillation frequency magnification for achieving a surface pattern including a portion in which the intervals between the scratches are unequal. More specifically, the oscillation command generation unit 17 generates an oscillation command having an oscillation frequency or an oscillation frequency magnification that is different from a frequency causing the scratches to be formed at equal intervals. An oscillation amplitude or an oscillation amplitude magnification is not limited to a particular value, and is generated according to the oscillation frequency or the oscillation frequency magnification. Note that the surface pattern including a portion in which the intervals between the scratches are unequal means that not all the intervals between the scratches necessarily have to be unequal, but some intervals between the scratches need to be unequal.

Figure 3:
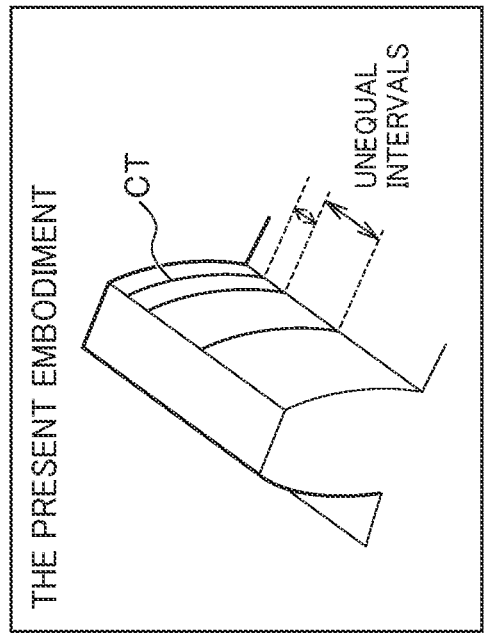
FIG. 3 is a diagram showing the principle of gear machining to be carried out by a control device for a machining tool according to an embodiment of the present disclosure.
Figure 3:
Figure 3:
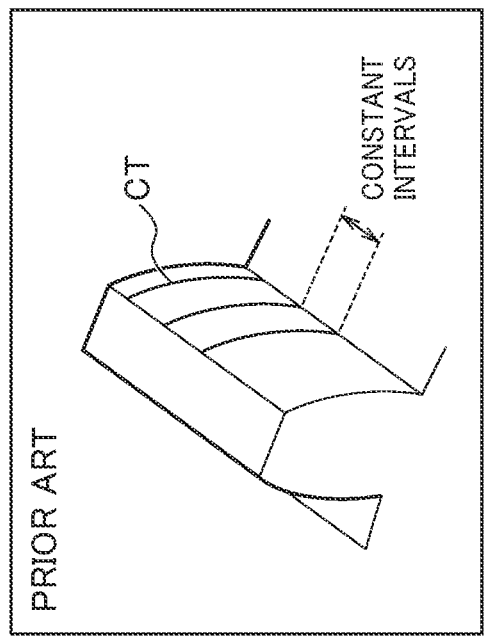

Here, FIG. 3 is a diagram showing the principle of gear machining to be carried out by the control device 10 for a machining tool according to the present embodiment. FIG. 3 shows an example in which a spur gear is machined in the same manner as FIG. 4 which will be described later. A workpiece W1 is rotated about the C axis by the workpiece shaft 2 and a tool T is rotated about the B axis by the tool shaft 3, whereby the workpiece W1 and the tool T are relatively moved in the Z direction (up-and-down direction in FIG. 3) so that grinding or cutting is performed on the workpiece W.

FIG. 3 shows an enlarged view of a region along a tooth trace in each of the conventional gear machining and the gear machining of the present embodiment. As shown in FIG. 3, in the gear machining according to the conventional position command, the intervals between contact points CT between the workpiece W1 and the tool T in each pass, in other words, the intervals between the scratches are constant, and all the intervals are equal. In contrast, in the gear machining according to the superimposed command of the present embodiment, the intervals between contact points CT between the workpiece W1 and the tool T in each pass, that is, the intervals between the scratches are unequal.

When the intervals between the scratches are thus made unequal, the peak of the frequency spectrum of the noise generated when the gears mesh with each other is reduced and dispersed, whereby the noise is reduced. The intervals between the scratches are shifted by superimposing the oscillation command to be unequal, whereby the intervals between the scratches can be regular unequal intervals as desired.

The oscillation command generation unit 17 may further generate, on the basis of the target surface pattern including a portion in which the intervals between the scratches input by a user are unequal, an oscillation command for achieving a surface pattern including a portion in which the intervals between the scratches are unequal. This makes it possible to more reliably obtain a surface pattern including unequal intervals as desired by the user.

Returning to FIG. 2, the display unit 18 can display at least one selected from the machining condition input by the machining condition input unit 15, the image of the target surface pattern input by the user, the parameters of the target surface pattern, the image of the surface pattern calculated by the surface pattern calculation unit 16, and the image of the surface pattern subjected to machining carried out on the basis of the superimposed command. This enables the user to visually confirm the machining condition, the image and parameters of the target surface pattern including unequal intervals, the image of the surface pattern including equal intervals to be calculated, and the image of the surface pattern including unequal intervals resulting from the machining carried out on the basis of the superimposed command, which are displayed on the display unit 18.

Figure 4:
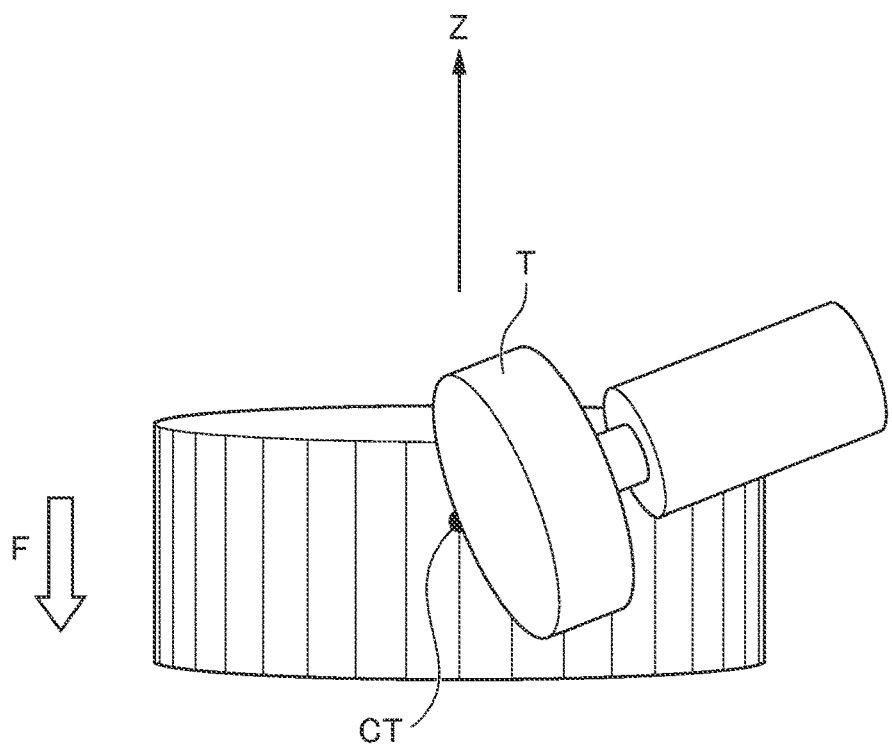
FIG. 4 is a diagram showing an example in which a spur gear is machined.

Next, a method of calculating the surface pattern (interval between scratches) by the surface pattern calculation unit 16 and a method of making the intervals between the scratches unequal will be described in detail with reference to FIG. 4. Here, FIG. 4 is a diagram showing an example in which a spur gear is machined. In FIG. 4, F represents a machining direction, and the workpiece W1 and the tool T are relatively moved in the workpiece axial direction of the workpiece W1 or the Z axis direction (up-and-down direction in FIG. 4).

FIG. 4 shows a tool contact point CT in a present pass when targeting one tooth trace on the workpiece W1. An interval d [mm] between the tool contact point CT in the present pass and the tool contact point CT in the next pass is expressed by the following equation (1) where V [mm/min] represents grinding/cutting speed, and S [rpm] represents a workpiece rotation speed. That is, the interval d between adjacent tool contact points CT, in other words, the interval d between the scratches is determined by the grinding/cutting speed V and the workpiece rotation speed S, and is constant.

[Expression 1]

$$d = \frac{V}{S} \qquad \text{Expression 1}$$

In the present embodiment, an oscillation command Vo is superimposed as expressed by the following equation (2) to make the intervals d between the scratches unequal.

[Expression 2]

$$d = \frac{V + V_O}{S} \qquad \text{Expression 2}$$

Here, for example, when the oscillation command Vo is assumed as a sine wave V(t)=A sin(ωt), and a required time from a point of time at which the machining of the workpiece W is started to a point of time at which the workpiece W is rotated by n times is represented by t(n), a change amount Δd of the interval d between scratches is expressed by the following equation (3).

[Expression 3]

$$\Delta d = \int \frac{V}{S} dt + \frac{V(t)}{S} dt = \frac{[V * \{t(n+1) - t(n)\} + A\cos\{\omega t(n)\} - A\{\cos(\omega t(n+1))\}]}{S} \qquad \text{Expression 3}$$

The required time t(n) from a point of time at which the machining of the workpiece W is started to a point of time at which the workpiece W is rotated by n times is obtained using the workpiece rotation number, and therefore it is found that Δd can be controlled by A and ω. This means that the interval d of the scratches can be controlled by the oscillation command Vo. ω for making the interval d between the scratches unequal is selected from a frequency group that is not synchronized to the workpiece rotation number. This is because in a frequency group (including an integer multiple of the workpiece rotation number) that is synchronized to the workpiece rotation number, a cos component becomes 0 and Δd becomes 0 as can be seen from the above-described Equation (3), and therefore the interval d between the scratches cannot be unequal.

Note that although the above description has been made of an example in which the oscillation acts in the Z axis direction, but the oscillation in the other axial directions can be described as well.

Next, a configuration in which the position speed control unit 14 synchronously controls a plurality of axes such that the workpiece W and the tool T are relatively oscillated in a direction (Z axis direction) along a tooth trace (tooth surface) will be described in detail with reference to FIG. 5. Here, FIG. 5 is a diagram showing an example in which a helical gear is machined.

Figure 5:
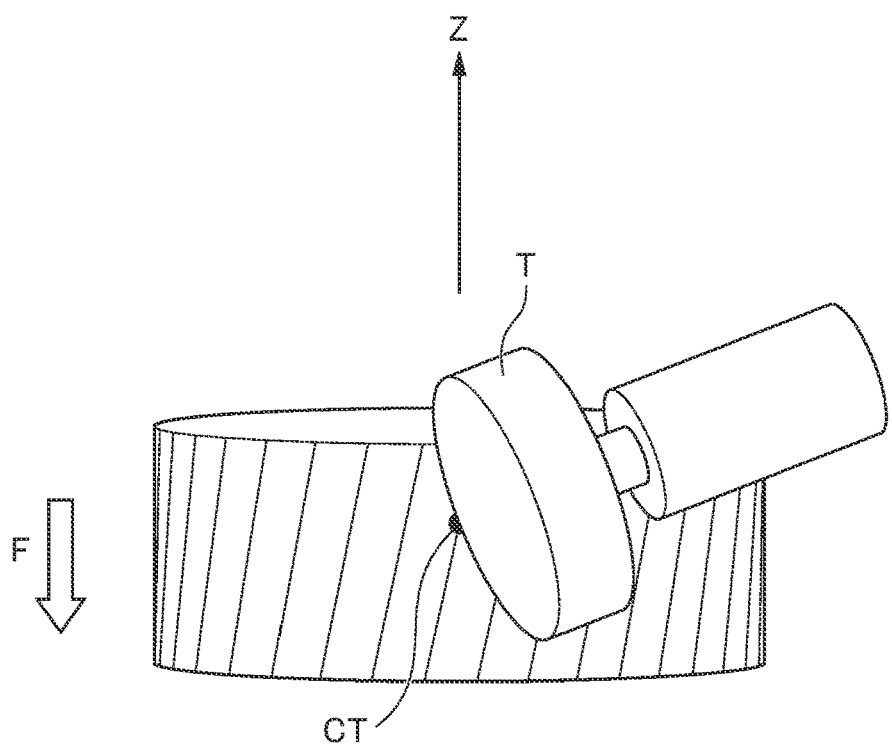
FIG. 5 is a diagram showing an example in which a helical gear is machined.

FIG. 5 shows a tool contact point CT in a present pass when targeting one tooth trace on a workpiece W2. As shown in FIG. 5, the tooth trace of the workpiece W2 is inclined with respect to the workpiece rotation axis (Z axis direction). To machine such a helical gear, it is necessary to move the tool T not only in the Z axis direction but also in the Y axis direction. That is, when the oscillation acts only in the Z axis direction, the machining shape is deformed, and therefore it is necessary to oscillate the plurality of axes to prevent such deformation. Accordingly, in the case where such a helical gear is machined, it is preferable that the position speed control unit 14 oscillates while synchronously controlling the plurality of axes.

Next, procedural steps by the control device 10 for a machine tool of the present embodiment will be described with reference to FIG. 6. Here, FIG. 6 is a flowchart showing procedural steps by the control device 10 for a machine tool according to the present embodiment.

First, in Step S1, a user inputs a machining condition using the machining condition input unit 15. After the input, the process proceeds to Step S2.

In Step S2, the surface pattern calculation unit 16 calculates, on the basis of the machining condition input in Step S1, a surface pattern defined on the basis of the intervals between scratches generated on a machined surface. Specifically, the interval between the scratches is calculated by the above-described equation (1). After the calculation, the process proceeds to Step S3.

In Step S3, an oscillation command is generated on the basis of the surface pattern calculated in Step S2. Specifically, the oscillation command Vo for achieving a desired surface pattern (intervals between scratches) is generated by the above-described equations (2) and (3). After the generation, the process proceeds to Step S4.

In Step S4, a superimposed command is generated by superimposing the superimposed command generated in Step S3 on the position command or the positional deviation. After the generation, the process proceeds to Step S5.

In Step S5, the position speed of the motor 30 is controlled on the basis of the superimposed command generated in Step S4, and the processing ends.

According to the present embodiment, the following effects can be achieved. In the present embodiment, there are provided a machining condition input unit 15 that can input a machining condition including at least one selected from specifications of a workpiece W, specifications of a tool T, a feedrate, a spindle speed, and the number of teeth, a surface pattern calculation unit 16 that calculates, based on the machining condition input by the machining condition input unit 15, a surface pattern defined depending on intervals between scratches generated on a machined surface; an oscillation command generation unit 17 that generates, based on the surface pattern calculated by the surface pattern calculation unit 16, an oscillation command for achieving a surface pattern including a portion in which the intervals between the scratches are unequal, and a position speed control unit 14 that carries out machining while oscillating the workpiece W and the tool T relative to each other based on the oscillation command generated by the oscillation command generation unit 17. In this way, the intervals between the scratches generated on the machined surface are thus made unequal, the peak of the frequency spectrum of the noise generated when the gears mesh with each other can be reduced and dispersed, whereby the occurrence of the periodic sound can be suppressed and the noise can be reduced. The intervals between the scratches are shifted by superimposing the oscillation command to be unequal, whereby the intervals between the scratches can be made unequal, and therefore, the intervals between the scratches can be the regular unequal intervals as desired, and the desired machining quality can be obtained with good reproducibility.

In addition, in the present embodiment, there is provided an adder 13 that superimposes the oscillation command on the movement command for causing the workpiece W and the tool T to move relative to each other or the positional deviation. This can obtain the above-described effects more reliably.

In the present embodiment, a configuration is adopted in which an oscillation command for achieving a surface pattern including a portion in which the intervals between the scratches are unequal is further generated based on the target surface pattern including a portion in which the intervals between the scratches input by a user are unequal. This makes it possible to reliably reduce noise when gears mesh with each other and to provide machining quality desired by the user.

In the present embodiment, a configuration is adopted in which an axis on which the oscillation command is to be superimposed is at least one axis selected from the feed axis, the tool rotation axis, and the workpiece rotation axis. This can prevent engagement itself between grooves of the workpiece W and the tool T from being changed by superimposing the oscillation command on at least one axis selected from among five axes in total including three axes of the X axis, the Y axis, and the Z axis which are the feed axes, the B axis which is the tool rotation axis, and the C axis which is the workpiece rotation axis, as in the case where the oscillation command is superimposed on the A axis which is the tool inclination axis.

In the present embodiment, a configuration is adopted in which a plurality of axes are synchronously controlled so that the workpiece W and the tool T are relatively oscillated in a direction along a tooth trace. In the case where a helical gear in which the tooth trace is inclined with respect to the work rotation axis (Z axis direction) is machined, for example, the oscillation acts not only in the Z axis direction but also in the Y axis direction, which makes it possible to prevent the machining shape from being deformed when the oscillation acts only in the Z axis direction.

In the present embodiment, a configuration is adopted in which a learning control unit is further provided which calculates a compensation amount of the superimposed command based on the positional deviation and adds the calculated compensation amount to the superimposed command to thereby compensate the superimposed command. This can improve the follow-up performance to a periodic oscillation command, whereby the above-described effects are achieved more reliably and the machining quality can be further improved.

In the present embodiment, a configuration is adopted in which the display unit 18 is further provided which can display at least one selected from the machining condition input by the machining condition input unit 15, the image of the target surface pattern input by the user, the parameters of the target surface pattern, the image of the surface pattern calculated by the surface pattern calculation unit 16, and the image of the surface pattern subjected to machining carried out based on the superimposed command. This enables the user to visually confirm the machining condition, the image and parameters of the target surface pattern including unequal intervals, the image of the surface pattern including equal intervals to be calculated, and the image of the surface pattern including unequal intervals resulting from the machining carried out based on the superimposed command, which are displayed on the display unit 18.

It is noted that the present invention is not limited to the above-described embodiment, and includes modifications and improvements within the scope which can achieve the object of the present invention.

EXPLANATION OF REFERENCE NUMERALS

1 Gear machine tool (machine tool)
2 Workpiece shaft

3 Tool shaft
10 Control device for machine tool
11 Adder
12 Integrator
13 Adder
14 Position speed control unit (control unit)
15 Machining condition input unit
16 Surface pattern calculation unit
17 Oscillation command generation unit
18 Display unit
30 Motor
CT Tool contact point
T Tool
W Workpiece

The invention claimed is:

1. A control device for a machine tool that machines a workpiece including at least one tooth surface, the control device for a machine tool comprising:
a processor,
the processor being configured to perform functions that comprise:
a function of inputting a machining condition including at least one selected from specifications of the workpiece, specifications of a tool, a feedrate, a spindle speed, and the number of teeth;
a function of calculating, based on the machining condition inputted, a surface pattern defined depending on intervals between scratches generated on a machined surface;
a function of generating, based on the surface pattern calculated, an oscillation command for achieving a surface pattern including a portion in which the intervals between the scratches are unequal, the oscillation command having an oscillation frequency or an oscillation frequency magnification that is different from a frequency causing the scratches to be formed at equal intervals; and
a function of carrying out machining while oscillating the workpiece and the tool relative to each other based on the oscillation command generated.

2. The control device for a machine tool according to claim 1, wherein
the processor superimposes the oscillation command on a movement command for causing the workpiece and the tool to move relative to each other or positional deviation to generate a superimposed command.

3. The control device for a machine tool according to claim 2, wherein
the processor calculates, based on the positional deviation, a compensation amount of the superimposed command and adds the calculated compensation amount to the superimposed command to thereby compensate the superimposed command.

4. The control device for a machine tool according to claim 2, wherein
an axis on which the oscillation command is to be superimposed is at least one axis selected from a feed axis, a tool rotation axis, and a workpiece rotation axis.

5. The control device for a machine tool according to claim 2, wherein
the processor allows for display of at least one selected from the machining condition inputted, an image of a target surface pattern inputted by a user, parameters of the target surface pattern, an image of the surface pattern calculated, and an image of the surface pattern subjected to machining carried out based on the superimposed command.

6. The control device for a machine tool according to claim 1, wherein
the processor generates, based on a target surface pattern inputted by a user and including a portion in which the intervals between the scratches are unequal, an oscillation command for achieving a surface pattern including a portion in which the intervals between the scratches are unequal.

7. The control device for a machine tool according to claim 1, wherein
the processor synchronously controls a plurality of axes such that the workpiece and the tool are relatively oscillated in a direction along a tooth trace.

* * * * *